May 14, 1963 H. W. GRAU 3,089,357
FEED MECHANISM ATTACHMENT FOR POWER DRIVEN PORTABLE DRILLS
Filed July 12, 1960 2 Sheets-Sheet 1
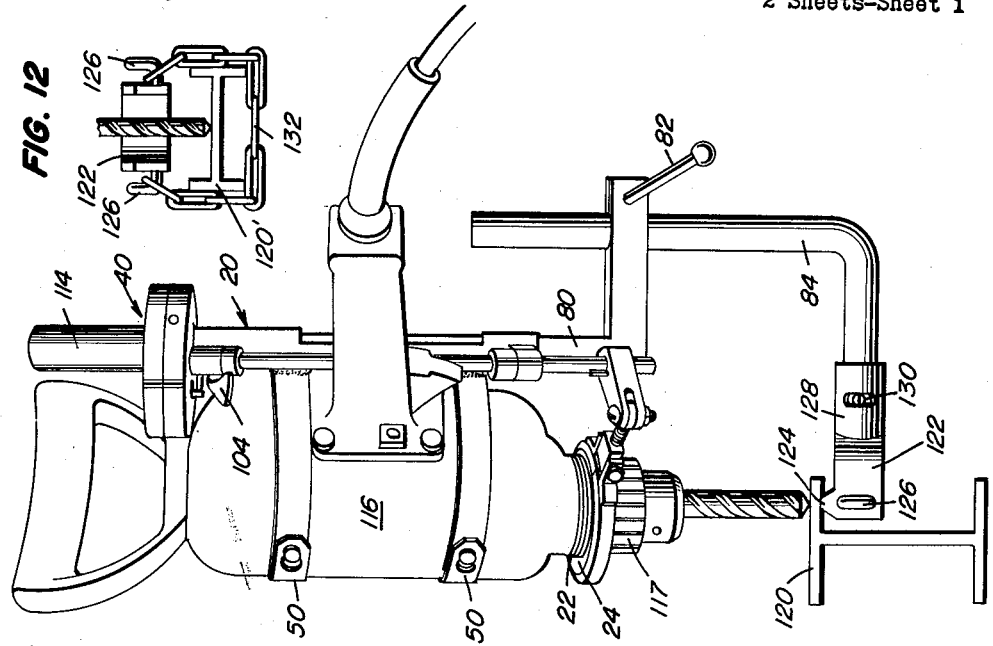
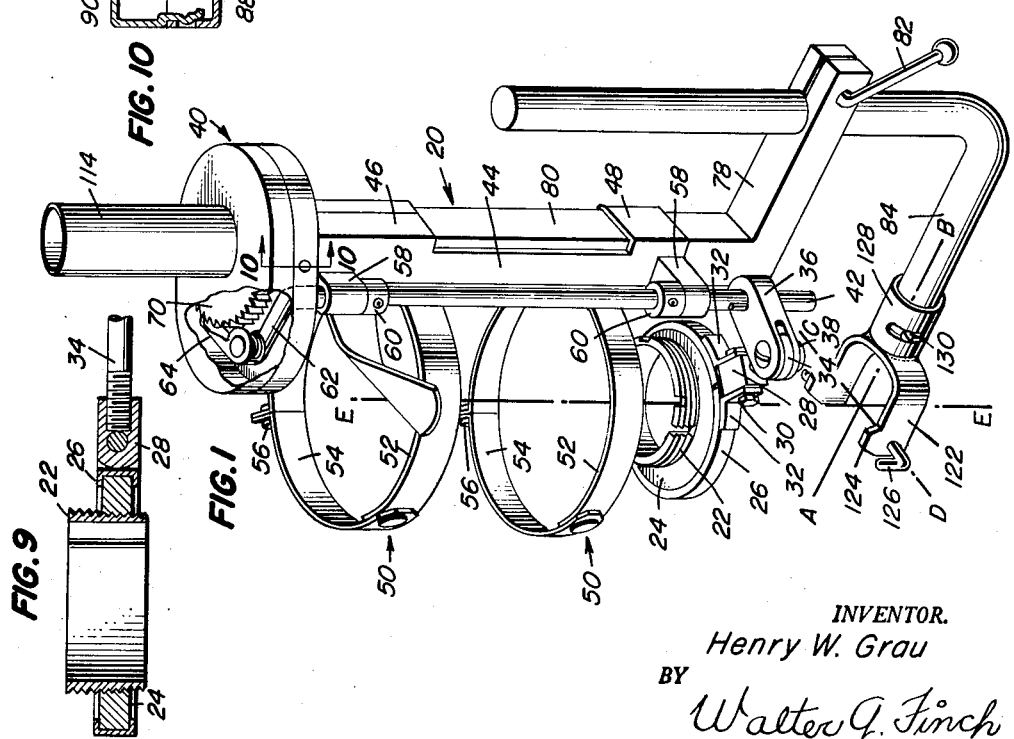
INVENTOR.
Henry W. Grau
BY
Walter G. Finch
ATTORNEY May 14, 1963 H. W. GRAU 3,089,357
FEED MECHANISM ATTACHMENT FOR POWER DRIVEN PORTABLE DRILLS
Filed July 12, 1960 2 Sheets-Sheet 2
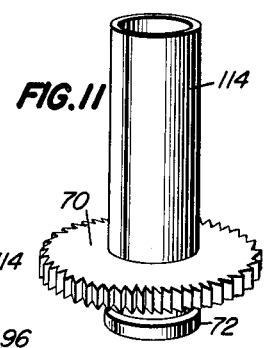
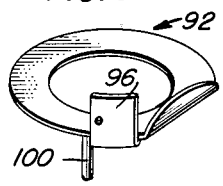
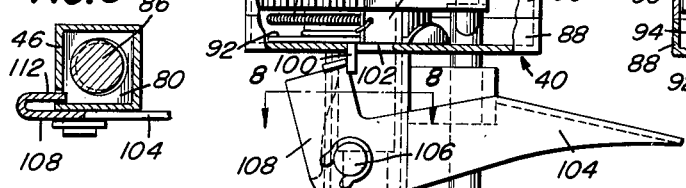
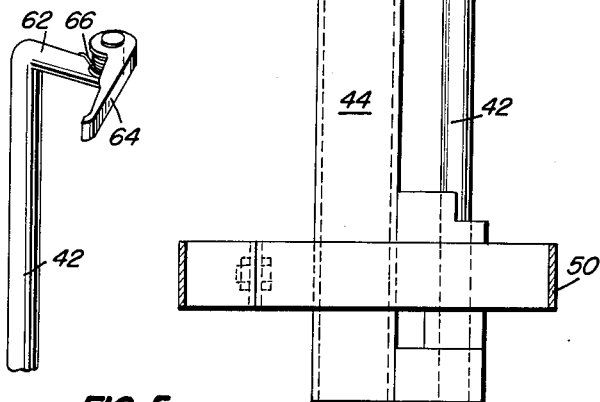
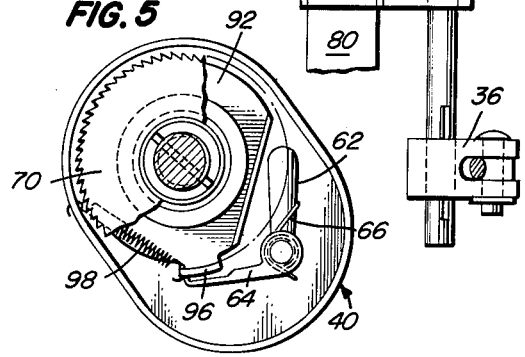
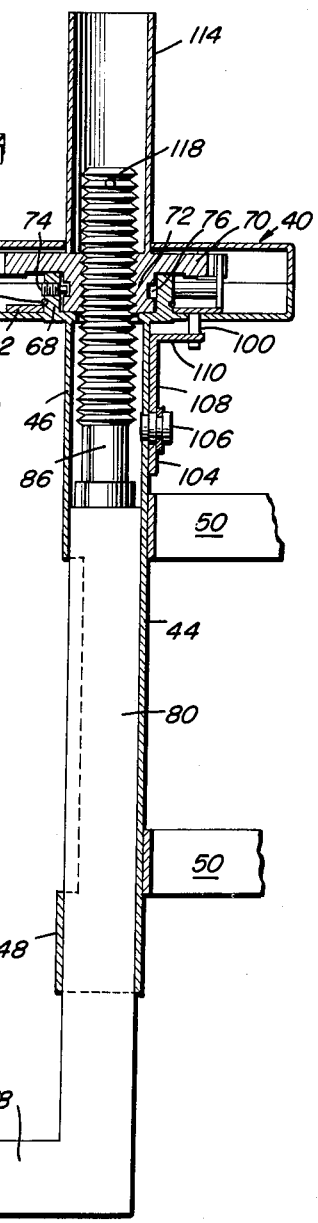
INVENTOR.
Henry W. Grau
BY
Walter G. Finch
ATTORNEY

United States Patent Office 3,089,357
Patented May 14, 1963

3,089,357
FEED MECHANISM ATTACHMENT FOR POWER DRIVEN PORTABLE DRILLS
Henry Walter Grau, 7925 York Road, Baltimore, Md.
Filed July 12, 1960, Ser. No. 42,357
4 Claims. (Cl. 77—33.9)

This invention relates to portable tools, and particularly it pertains to power driven portable drils and the like.

In the operation of a portable drill which is provided with an electric or compressed air motor to rotate the drill spindle, the force to press the drill to the work to be drilled is usually provided manually or by the operator throwing his weight against the breast plate of the drill. Naturally the efficiency of this method in feeding the drill to the work depends upon the skill and endurance of the muscles of the operator.

It is an object of this invention, therefore, to provide means for utilizing the motive power of the drill to furnish the force to feed the drill to the work by providing a power take-off at the drill spindle.

Another object of this invention is to provide an adjustable grab arm, whereby the feeding mechanism may be applied directly to the work to be drilled through a holding means attached to the work.

Another object of this invention is to provide a control means for a drill feed mechanism so that it may be engaged or disengaged and also to control the feeding speeds thereof to certain variable limits.

Still another object of this invention is to provide an operational mechanism mounted on an attachable bracket by which it is secured to the drill casing wherever it is undesirable to build feeding mechanism integral with the drill casing.

Other objects of this invention are to provide a drill feed mechanism which is of light weight, of high strength, simplicity in construction, and operational safety features.

Other objects and advantages of this invention will be made more readily apparent and understood from the following detailed specification and accompanying drawings in which:

FIG. 1 is a perspective view, partly broken away, of a power feed attachment for a portable drill incorporating features of this invention;

FIG. 2 is a perspective view of the power feed attachment of FIG. 1 at a slightly different angle of view showing the power feed attachment installed on a portable electric drill;

FIG. 3 is a vertical elevation of the power feed attachment, partly broken away, illustrating details of the ratchet feed mechanism;

FIG. 4 is a vertical section of the power feed attachment including the ratchet feed mechanism taken at right angles to FIG. 3;

FIG. 5 is a top view of the ratchet feed mechanism with cover removed and with the ratchet wheel partly broken away;

FIG. 6 is a perspective view of the ratchet control ring;

FIG. 7 is a perspective view of a pawl and a portion of the oscillating shaft;

FIG. 8 is a cross section taken along line 8—8 of FIG. 3;

FIG. 9 is a cross section of a clamp collar, an eccentric cam and a strap therefor;

FIG. 10 is a cross section taken along line 10—10 of FIG. 1 of a cover fastening means;

FIG. 11 is a perspective view of a ratchet wheel and hand piece; and

FIG. 12 is a perspective view of a workpiece being held by a chain and drilled.

Referring to FIG. 1 of the drawing, there is shown generally by reference numeral 20 a power feed attachment for a portable drill 116, such as illustrated in FIG. 2. The power feed attachment 20 is provided with a split resilient cylindrical collar 22 having an external tapering thread.

An eccentric cam 24 is threaded on this collar 22, and is arranged so it can squeeze or constrict it. An eccentric strap 26 is positioned and held around the cam 24 as shown in detail in FIG. 9, and it is clamped to a block 28, with a bolt 30 which engages a pair of strap supporting ears 32. The block 28 is provided with a threaded hole for receiving a connecting rod 34. The rod is flattened and it is drilled and pivotally attached to an oscillating crank 36 by means of a crank pin 38. The crank 36 is keyed to an oscillating shaft 42 which extends downwardly thereto from a feed mechanism assembly 40.

The feed mechanism assembly 40 is mounted on a bracket 44, which consists of a channel portion having spaced opposite ends which are formed into square slide bearings 46 and 48. The bracket 44 is provided with a pair of spaced adjustable bands 50 for attaching to the casing of the drill, as shown in FIG. 2.

The bands 50 each consist of two parts, namely a yoke 52 and a strap 54. The yoke 52 of each band 50 is formed of soft metal which is thick enough to retain its shape after once being fitted to the casing of the drill. The other portion of each band 50, that is the strap 54, is formed of resilient and flexible material to conform to the drill casing when a bolt 56 is tightened.

The bracket 44 is provided with two spaced pivot bearings 58 for supporting the oscillating shaft 42 which is held in place by two retaining collars.

The upper end of shaft 42 is provided with a crank 62, as shown in FIG. 7, which pivotally supports a ratchet pawl 64 and a ratchet pawl spring 66.

A support and thrust bearing 68, best illustrated in FIG. 4 is attached to the upper slide bearing 46. The bearing 68 receives a hub 72 of a ratchet wheel 70. A retaining screw 74 which fits into an annular groove 76 of the hub 72 keeps the wheel 70 in place.

A square draw rod 80, having a split and drilled arm 78 extending from its lower end at right angles, is provided with a clamp 82, as shown best in FIGS. 1, 2, 3, and 4. The split and drilled arm 78 slidably supports a hook or grab arm 84 providing both longitudinal and rotary adjustment thereof. The square draw rod 80 is slidable within the bearings 46 and 48. A threaded round extension 86 which engages with an internal thread in the hub 72 is attached to the upper end of the draw rod 80. The lower portion of the threaded round extension 86 is free of threads to permit the ratchet wheel 70 to spin free when the upper limit of movement of the square draw rod 80 is reached.

A stop pin 118 is pressed into a hole drilled in the top end of the extension 86 to limit opposite movement thereof.

The feed mechanism assembly 40, shown best in FIGS. 1, 3, and 4 basically consists of an oblong cup shaped housing 88 which is attached to the lower surface of the thrust bearing 68 and a drawn cover 90 which is retained in place by a marginal flange and a boss fitting a hole as shown in FIG. 10.

A ratchet control ring, 92, shown generally in FIGS. 3 and 4 and in detail in FIG. 6, is fitted to rotate around the thrust bearing 68. As shown in FIGS. 3 and 4 this ratchet control ring rests on the inner surface of ratchet housing 88 and it is held in place with a retaining spring 94, which is fitted into an annular groove in the thrust bearing 68. The ratchet control ring 92 is provided with an arc shaped fin 96, arranged vertically to the surface of ring 92, and placed so as to have rotary movement between the ratchet pawl 64 and the teeth of the ratchet wheel 70, as shown in FIG. 5.

A tension coil spring 98 which is attached to fin 96 and which is anchored to ratchet housing 88 tends to rotate the ratchet control ring 92. A pin 100 which is attached to the ring 92 projects downwardly and through a slot 102 in the housing 88. A thumb lever 104 is pivotally secured on a boss 106 which is attached to the bearing 46.

The lever 104 is provided with an L-shaped extension 108. The end of this extension 108 is in turn provided with a finger 110, which is best illustrated in FIG. 4, and which projects outwardly so as to engage the pin 100 and thus control the movement of the control ring 92 when the thumb lever 104 is pressed.

As shown in FIG. 8 an L-shaped extension 108 of the thumb lever 104 is also provided with a wedge-shaped fin 112 which protrudes through a slotted opening in the wall of the upper slide bearing 46, so as to be in the path of the upper end of the square draw rod 80.

A tubular hand piece and thread guard 114 is attached to the top side of the ratchet wheel 70, as shown in detail in FIG. 11. The hand piece and thread guard 114 projects through an aperture in the top of the feed mechanism assembler 40, as shown best in FIG. 1.

In order to properly balance and aline a portable drill with power feed and having a grab arm for effecting the force of the drill to the work to be drilled, it is necessary that the grab arm contact give clearance to the drill bit. Also, the force should be centered substantially in line with the axis of the drill spindle and, at the same time, be universally pivoted (to a limited angle) in relation with the drill casing (supporting handles).

This feature is provided by a two finger forked piece 122 pivoted on the grab arm 84 with its axis AB intersecting the axis EE of the drill spindle at right angle, with the forked piece 122 provided with a sleeve 128 loosely fitting the grab arm 84. It is retained in position and permitted limited rotation by a stud 130 set in the grab arm 84.

The surfaces of the top edge of the forked fingers are provided with rounded bosses 124 which contact the work to be drilled 120 with the bosses 124 permitting limited pivoting in relation to the work to be drilled, with the axis CD of the pivot intersecting the axis EE of the drill spindle 117 at right angle and also being at right angle to the axis AB of the grab arm 84, thus affording a universally pivoted contact with clearance for the drill bit. The two fingered piece 122 are each provided with a hook 126 supporting a chain 132 attached to work to be drilled where this is desirable.

In FIG. 2, the power feed attachment 20 is shown set up for operational use in connection with a drill having a casing. The chuck 118 of a portable drill 116 is inserted into the split collar 22. The body of the drill 116 is secured by means of the bands 50. The threaded cam 24 is now tightened upon the tapered threads of the split collar 22 to constrict it around the drill chuck 117.

In the idle condition the previously mentioned coil spring 98 holds the ratchet control ring 90 so that its fin 96 is in an interfering or neutral position between the pawl 64 and the ratchet wheel 70. This position is defined by the extreme leftward position of pin 100 in the slot 102 as shown in FIGS. 3 and 5. It will be noted that the thumb lever 104 is thus held in a raised position.

The operator of the drill 116 next rotates the hand piece 114 so that the square draw rod 80 is extended to its extreme length or until the ratchet wheel 70 is stopped by the stop pin 118 in the top of the threaded extension 86. After the grab arm 84 has been adjusted to the work 120 to be drilled, the motor of the drill 116 is started. When the operator wishes to engage the power feed, he presses the thumb lever 104 which rotates the ratchet control ring 92 and exposes the ratchet wheel 70 to the ratchet pawl 64.

The rotating chuck 117 turns the eccentric cam 24. The eccentric strap 26 reciprocates, oscillating the crank 36 through the connecting rod 34. Shaft 42 transmits this motion up to the feed mechanism assembly 40 where the crank 62 gives the pawl 64 a push-pull motion against the teeth of ratchet wheel 70.

Ratchet wheel 70 step rotates on the threaded extension 86 to pull the draw rod 80 upwardly, thus, the grab arm 84 is drawn upwardly and the drill is advanced into the work 120.

The thumb lever 104 permits one, two, or three ratchet teeth to be exposed by the fin 96 and engaged in one oscillation of the ratchet pawl 64, thus giving three selective feeding speeds.

When the thumb lever 104 is released, the spring 98 automatically rotates the ratchet control ring 92 so that it shields the ratchet pawl 64 from engagement therewith.

When the effective length of the threaded extension 86 is reached, the upper end of the square draw rod 80 contacts the wedged shaped fin 112 which lifts the thumb lever 104, thus warning the operator of the upper limit of movement of the square draw rod 80.

In case of failure of mechanical parts or of the failure of the operator to release the ratchet gear, the hub of the ratchet gear will move to the lower thread-free portion of the round extension 86 which permits the ratchet wheel 70 to spin ineffectually.

Obviously, many modifications and variations of the present invention are possible in light of the above teachings. It is, therefore, to be understood that within the scope of the appended claims the invention may be practiced otherwise than as specifically described.

What is claimed is:

1. In combination with a motive power driven portable drill having a drill spindle and a casing for said drill, means including a detachable bracket having slide bearings and mounted on said casing, a draw rod having an adjustable grab arm for attaching to work to be drilled, said draw rod being slidably supported by said slide bearings for longitudinal movement relative to said drill spindle, a ratchet-wheel having threads, said draw rod having a threaded extension engageable with said threads for supporting said ratchet-wheel, a detachable oscillator mounted on said drill spindle and having a ratchet pawl for engaging said ratchet-wheel for effecting the feed of said drill, and a control means for controlling the engagement and disengagement as well as the variable speeds of the feed of said drill independently of said oscillator.

2. In the combination as recited in claim 1, and additionally means for automatically disengaging said draw rod from the motive power of said drill when the movable limit of the feed of said drill is reached.

3. In combination as recited in claim 1, an additional means including a collar having an opening through its length to provide a variable diameter thereof, said collar having tapering threads on its external surface, an eccentric cam having internal threads for fitting said tapering threads on said collar for tightening said collar to said spindle, whereby said oscillator can be attached thereto.

4. In the combination as recited in claim 1, wherein said control means includes a ring supported for rotary movement about the axis of said ratchet-wheel, a shielding fin for controlling the engagement of said ratchet pawl in relation to said ratchet-wheel from neutral to one or more ratchet-wheel teeth, whereby said drill feed can be engaged as well as disengaged and the feeding speeds of the said drill can be controlled.

References Cited in the file of this patent

UNITED STATES PATENTS

| 614,866 | Hotchkiss | Nov. 29, 1898 |
| 1,343,370 | Le Sueur | June 15, 1920 |